United States Patent [19]

Sitek et al.

[11] 4,404,461
[45] Sep. 13, 1983

[54] METHOD AND APPARATUS FOR CONTROLLING AN ANALYTICAL FURNACE

[75] Inventors: George J. Sitek, Stevensville; Richard B. Haigh, Buchanen, both of Mich.

[73] Assignee: Leco Corporation, St. Joseph, Mich.

[21] Appl. No.: 190,357

[22] Filed: Sep. 24, 1980

[51] Int. Cl.³ .............................................. H05B 1/02
[52] U.S. Cl. .................................. 219/490; 219/492; 219/494; 432/156; 73/25; 323/319; 373/136; 373/118
[58] Field of Search ............... 219/494, 501, 492, 493, 219/497, 508–510, 506; 13/24, 25; 432/156; 323/235, 322, 319, 238, 322, 241, 319; 73/25, 26, 19

[56] References Cited

U.S. PATENT DOCUMENTS

| | | | |
|---|---|---|---|
| 3,569,602 | 3/1971 | Norem | 13/24 |
| 3,855,452 | 12/1974 | Flaza et al. | 219/492 |
| 3,901,437 | 8/1975 | Haskins | 219/492 |
| 4,229,412 | 10/1980 | Orths et al. | 73/25 |
| 4,233,498 | 11/1980 | Payne et al. | 219/490 |

FOREIGN PATENT DOCUMENTS 624091 9/1978 U.S.S.R. ............... 432/156

OTHER PUBLICATIONS

Analytical Chemistry vol. 46 #8 Jul. 1974, pp. 1028–1031 "Temperature Controlled Heating of Graphite Tube".

Primary Examiner—M. H. Paschall
Attorney, Agent, or Firm—Price, Heneveld, Huizenga & Cooper

[57] ABSTRACT

A control system for applying operating power to an analytical furnace includes a first circuit providing output signals consisting of a series of binary bits in a predetermined pattern with each bit corresponding to a unit of power to be applied to an analytical furnace according to the pattern of bits and a control circuit coupled to the first circuit and including output terminals for coupling the control circuit to an analytical furnace. The control circuit responds to the binary bits to provide pulses of operating power to the output terminals in a sequence corresponding to and controlled by the binary bits. The pattern of bits provides stepwise increasing temperature levels for the analytical furnace in a very predictable and controlled fashion such that samples combusted by the furnace will emit specimen gases associated with different compounds containing the specimen gas at different temperature levels.

11 Claims, 6 Drawing Figures

| Step \ Bit | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| 1  | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2  | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 3  | 0 | 1 | 1 | 1 | 1 | 1 | 1 | 1 | 1 | 1 | 1 | 1 | 1 | 1 | 1 | 1 | 0 | 1 | 1 | 1 | 1 | 1 | 1 | 1 | 1 | 1 | 1 | 1 | 1 | 1 | 1 | 1 |
| 4  | 0 | 1 | 1 | 1 | 1 | 1 | 1 | 1 | 1 | 1 | 0 | 1 | 1 | 1 | 1 | 1 | 1 | 1 | 1 | 0 | 1 | 1 | 1 | 1 | 1 | 1 | 1 | 1 | 1 | 1 | 1 | 1 |
| 5  | 0 | 1 | 1 | 1 | 1 | 1 | 0 | 1 | 1 | 1 | 1 | 1 | 1 | 0 | 1 | 1 | 1 | 1 | 1 | 1 | 0 | 1 | 1 | 1 | 1 | 1 | 1 | 1 | 1 | 1 | 1 | 1 |
| 6  | 0 | 1 | 1 | 1 | 1 | 0 | 1 | 1 | 1 | 1 | 0 | 1 | 1 | 1 | 1 | 1 | 0 | 1 | 1 | 1 | 1 | 0 | 1 | 1 | 1 | 1 | 1 | 1 | 1 | 1 | 1 | 1 |
| 7  | 0 | 1 | 1 | 1 | 1 | 0 | 1 | 1 | 1 | 0 | 1 | 1 | 1 | 1 | 0 | 1 | 1 | 1 | 0 | 1 | 1 | 1 | 1 | 0 | 1 | 1 | 1 | 1 | 0 | 1 | 1 | 1 |
| 8  | 0 | 1 | 1 | 1 | 0 | 1 | 1 | 1 | 0 | 1 | 1 | 0 | 1 | 1 | 1 | 0 | 1 | 1 | 0 | 1 | 1 | 1 | 0 | 1 | 1 | 1 | 0 | 1 | 1 | 1 | 1 | 1 |
| 9  | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 | 1 | 1 |
| 10 | 0 | 1 | 1 | 0 | 1 | 1 | 0 | 1 | 1 | 0 | 1 | 1 | 0 | 1 | 1 | 0 | 1 | 1 | 1 | 0 | 1 | 1 | 0 | 1 | 1 | 0 | 1 | 1 | 0 | 1 | 1 | 1 |
| 11 | 0 | 1 | 1 | 0 | 1 | 1 | 0 | 1 | 1 | 0 | 1 | 1 | 0 | 1 | 1 | 1 | 0 | 1 | 1 | 0 | 1 | 1 | 0 | 1 | 1 | 0 | 1 | 1 | 0 | 1 | 1 | 1 |
| 12 | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 |
| 13 | 0 | 1 | 1 | 0 | 1 | 1 | 0 | 1 | 0 | 1 | 1 | 0 | 1 | 1 | 0 | 1 | 0 | 1 | 1 | 0 | 1 | 1 | 0 | 1 | 0 | 1 | 1 | 0 | 1 | 1 | 0 | 1 |
| 14 | 0 | 1 | 1 | 0 | 1 | 0 | 1 | 1 | 0 | 1 | 0 | 1 | 1 | 0 | 1 | 0 | 1 | 1 | 0 | 1 | 0 | 1 | 1 | 0 | 1 | 0 | 1 | 1 | 0 | 1 | 0 | 1 |
| 15 | 0 | 1 | 0 | 1 | 1 | 0 | 1 | 0 | 1 | 0 | 1 | 0 | 1 | 1 | 0 | 1 | 0 | 1 | 0 | 1 | 1 | 0 | 1 | 0 | 1 | 0 | 1 | 0 | 1 | 1 | 0 | 1 |
| 16 | 0 | 1 | 0 | 1 | 0 | 1 | 0 | 1 | 0 | 1 | 1 | 0 | 1 | 0 | 1 | 0 | 1 | 0 | 1 | 0 | 1 | 0 | 1 | 0 | 1 | 0 | 1 | 1 | 0 | 1 | 0 | 1 |
| 17 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 18 | 0 | 1 | 0 | 1 | 0 | 1 | 0 | 0 | 1 | 0 | 1 | 0 | 1 | 0 | 1 | 0 | 1 | 0 | 1 | 0 | 0 | 1 | 0 | 1 | 0 | 1 | 0 | 1 | 0 | 1 | 0 | 1 |
| 19 | 0 | 0 | 1 | 0 | 1 | 0 | 1 | 0 | 0 | 1 | 0 | 1 | 0 | 1 | 0 | 0 | 1 | 0 | 1 | 0 | 1 | 0 | 0 | 1 | 0 | 1 | 0 | 1 | 0 | 0 | 1 | 0 |
| 20 | 0 | 1 | 0 | 0 | 1 | 0 | 1 | 0 | 0 | 1 | 0 | 1 | 0 | 0 | 1 | 0 | 1 | 0 | 0 | 1 | 0 | 1 | 0 | 0 | 1 | 0 | 1 | 0 | 0 | 1 | 0 | 1 |
| 21 | 0 | 0 | 1 | 0 | 1 | 0 | 0 | 1 | 0 | 0 | 1 | 0 | 1 | 0 | 0 | 1 | 0 | 1 | 0 | 0 | 1 | 0 | 0 | 1 | 0 | 0 | 1 | 0 | 1 | 0 | 0 | 1 |
| 22 | 0 | 0 | 1 | 0 | 0 | 1 | 0 | 0 | 1 | 0 | 0 | 1 | 0 | 0 | 1 | 0 | 1 | 0 | 0 | 1 | 0 | 0 | 1 | 0 | 0 | 1 | 0 | 0 | 1 | 0 | 0 | 1 |
| 23 | 0 | 0 | 0 | 1 | 0 | 0 | 1 | 0 | 0 | 1 | 0 | 0 | 1 | 0 | 0 | 1 | 0 | 0 | 0 | 1 | 0 | 0 | 1 | 0 | 0 | 1 | 0 | 0 | 1 | 0 | 0 | 1 |
| 24 | 0 | 0 | 0 | 1 | 0 | 0 | 1 | 0 | 0 | 0 | 1 | 0 | 0 | 1 | 0 | 0 | 0 | 1 | 0 | 0 | 1 | 0 | 0 | 0 | 1 | 0 | 0 | 1 | 0 | 0 | 0 | 1 |
| 25 | 0 | 0 | 0 | 1 | 0 | 0 | 0 | 1 | 0 | 0 | 0 | 1 | 0 | 0 | 0 | 1 | 0 | 0 | 0 | 1 | 0 | 0 | 0 | 1 | 0 | 0 | 1 | 0 | 0 | 0 | 0 | 1 |
| 26 | 0 | 0 | 0 | 1 | 0 | 0 | 0 | 0 | 1 | 0 | 0 | 0 | 1 | 0 | 0 | 0 | 0 | 1 | 0 | 0 | 0 | 1 | 0 | 0 | 0 | 0 | 1 | 0 | 0 | 0 | 0 | 1 |
| 27 | 0 | 0 | 0 | 0 | 0 | 1 | 0 | 0 | 0 | 0 | 1 | 0 | 0 | 0 | 0 | 1 | 0 | 0 | 0 | 0 | 0 | 1 | 0 | 0 | 0 | 0 | 1 | 0 | 0 | 0 | 0 | 1 |
| 28 | 0 | 0 | 0 | 0 | 0 | 0 | 1 | 0 | 0 | 0 | 0 | 0 | 1 | 0 | 0 | 0 | 0 | 0 | 1 | 0 | 0 | 0 | 0 | 0 | 1 | 0 | 0 | 0 | 0 | 0 | 0 | 1 |
| 29 | 0 | 1 | 0 | 0 | 0 | 0 | 0 | 0 | 1 | 0 | 0 | 0 | 0 | 0 | 0 | 0 | 1 | 0 | 0 | 0 | 0 | 0 | 0 | 0 | 1 | 0 | 0 | 0 | 0 | 0 | 0 | 0 |
| 30 | 0 | 0 | 0 | 0 | 0 | 0 | 0 | 0 | 1 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 1 |
| 31 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 |
| 32 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 33 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

METHOD AND APPARATUS FOR CONTROLLING AN ANALYTICAL FURNACE

BACKGROUND OF THE INVENTION

The present invention pertains to a furnace control method and apparatus for use in controllably increasing the temperature of an analytical furnace in a predictable manner such that specimen gas from different compounds can be separately detected.

During the manufacturing of steel it is necessary to periodically analyze small samples (0.1 to 2 grams) to determine the composition of the melt and particularly the oxygen content thereof. A variety of well-known analyzers are commercially available for providing a quick analysis of such samples providing the total oxygen content contained in a given sample. It is desirable also however to determine from which specific compounds the oxygen is derived. Thus, for example, it is desirable to determine whether the oxygen is eminating from compounds such as FeO, $SiO_2$, $TiO_2$, $Al_2O_3$, or the like in a steel or cast-iron alloy during the smelting or other stages of steel production.

One system proposed in the prior art is disclosed in German patent application Ser. No. 27 55 587 published on June 21, 1979 in which an optical detector is positioned to receive radiation from the combustion zone and thereby detect the temperature of combustion. The signal from the optical detector is employed for controlling the furnace temperature in a linear fashion at a rate of 20° to 350° centigrade per second. Although such a system will provide separable oxygen peaks for the various oxygen compounds contained in a sample, the temperature sensed by the detector is adversely affected by fusion contaminates such as ash present in the fusion zone. Since the optical window becomes coated with fusion by-products affecting the accuracy of the detected and measured temperature, it is not believed that such a temperature measuring system is practical in the environment of the present invention to achieve accurate and repeatable results.

SUMMARY OF THE PRESENT INVENTION

The system of the present invention provides an increasing temperature by controlling the power applied to the furnace in a predictable and selectable fashion. Inasmuch as the furnace temperature is directly related to the power applied, the temperature of fusion can be ascertained over a range of temperatures such that oxygen peaks for various compounds can be accurately detected regardless of the presence of contaminates in the fusion zone.

The system of the present invention encompasses a method of stepwise applying a selectable combination of individual cycles of operating power to a furnace to stepwise increase the power level and therefore the temperature of the furnace during a fusion cycle. Apparatus enbodying the present invention includes a control circuit for providing a series of power impulses to an electrically operated furnace for stepwise increasing the power level applied to the furnace in a predetermined and selectable sequence. In the preferred embodiment of the invention, the furnace is employed in combination with an analyzer for detecting the gaseous by-products of fusion as temperature increases to provide a series of detectable peaks according to the content of the specimen sample.

These and other objects, features and advantages of the present invention will become apparent to those skilled in the art upon reading the following description thereof together with reference to the accompanying drawings in which:

DETAILED DESCRIPTION OF THE PREFERRED EMBODIMENT

Figure 1:
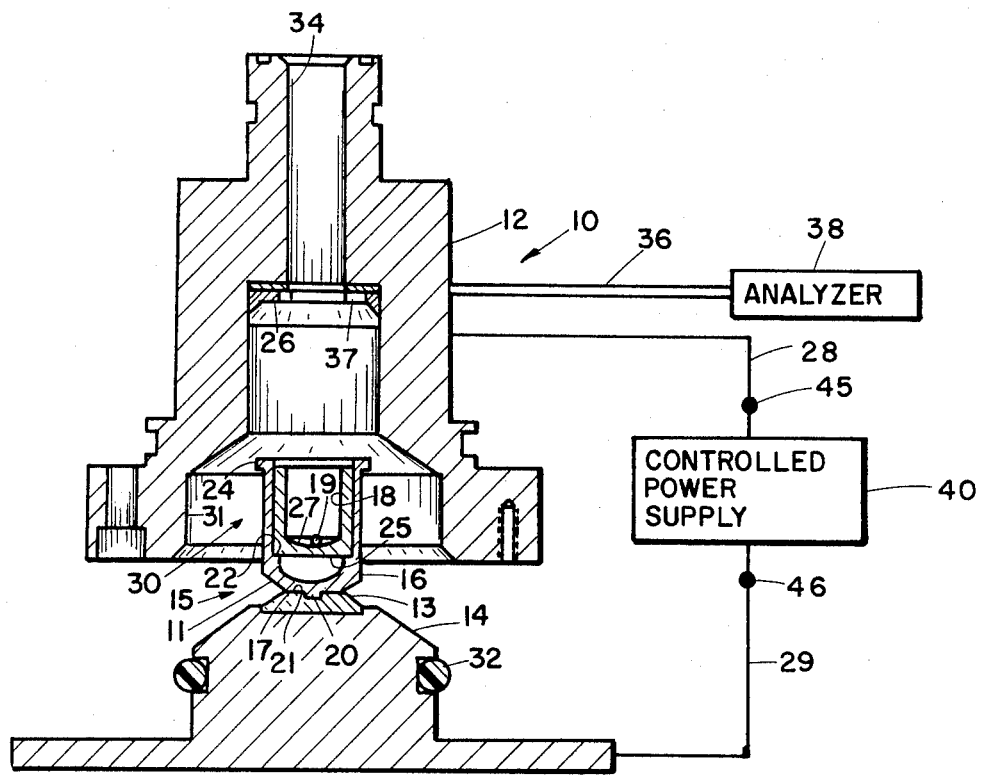
FIG. 1 is a cross sectional view partly in block diagram form of a furnace embodying the present invention.

Referring initially to FIG. 1 there is shown a furnace 10 embodying the control system of the present invention. The furnace includes an upper electrode 12 and a lower electrode 14 between which there is positioned a graphite crucible assembly 15. The crucible assembly 15 includes a heating crucible 16 and a sample holding crucible 18 in which a 0.1 to 2 gram sample 19 is positioned. Crucible assembly 15 is described in greater detail in U.S. Patent application Ser. No. 190,358 entitled Crucible filed concurrently herewith. A brief description of the graphite crucible assembly 15 however is provided. The generally cylindrical heating crucible 16 includes a downwardly projecting centrally located centering button 20 for centering the heating crucible on a tungsten alloy insert 13 associated with lower electrode 14. The bottom of the crucible 16 is chamfered around its outer peripheral edge 11 to provide an annular contact surface 17 for engaging tip 13 such that the current contact area is the annular surface surrounding projection 20. The interior floor of heating crucible 16 is rounded in a hemispherical fashion for reducing the cross-sectional current area through the floor of the crucible for providing uniform heating of the crucible. An annular ledge 22 is provided at the upper edge of the hemispherical recess 21 of the heating crucible floor for supporting the cylindrical sample holding crucible 18. The upper edge of heating crucible 16 includes an annular outwardly projecting shoulder 24 which engages an annular tungsten alloy insert 26 associated with upper electrode 12. Crucible 18 also has a flat bottom 25 and a hemispherically shaped interior floor 27 providing centering of the sample 19 positioned therein. The height of the walls of the crucible 18 is slightly less than that of heating crucible 16 such that only graphite crucible 16 engages the pair of copper electrodes 12 and 14 at the upper annular shoulder 24 and annular surface 23 respectively.

In FIG. 1 the electrodes are shown in an open position with the understanding that the lower electrode 14 is raised to fit within the configured opening 30 in upper electrode 12 with an O-ring seal 32 positioned within a recess in the lower electrode 14 engaging the inner cylindrical wall 31 of electrode 12 for sealing the two electrodes together to define a sealed combustion chamber containing crucible assembly 15. Carrier gas for analysis is supplied to the open mouth of crucible 18 through a downwardly projecting cylindrical opening 34 in upper electrode 12 while the gaseous by-products of combustion are provided to an analyzer 38 by means of a conduit 36 coupled to the interior of the furnace by means of slots 37 in the electrode contact 26. The electrodes 12 and 14 are supported in a furnace housing in a conventional manner such that the lower electrode 14 can be raised to an operative position or lowered to a loading position as shown in FIG. 1 by suitable cylinders and controls. Such furnace housing and controls are generally conventional and commercially available from Leco Corporation, the assignee of the present invention.

Coupled to the electrodes 12 and 14 by conductors 28 and 29 and output terminal means 45 and 46 is a controlled power supply 40 of the present invention which supplies in a stepwise fashion, increasing levels of power to the analytical furnace 10 comprising the electrodes and the graphite crucible assembly 15. This increases the temperature applied to specimens 19 of fuse the specimen to provide gaseous by-products of fusion which are supplied to the analyzer for subsequent analysis.

Figure 2:
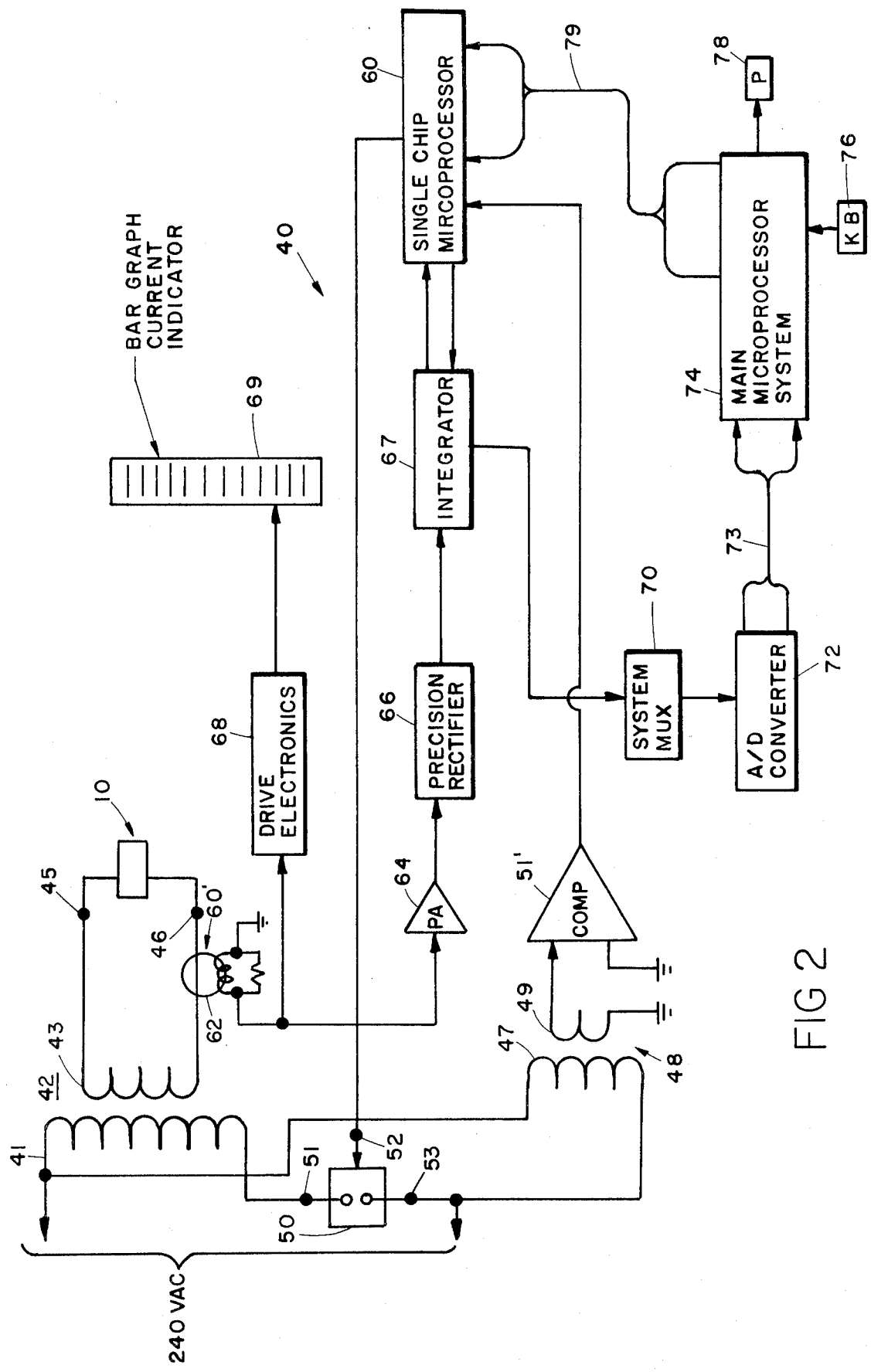
FIG. 2 is an electrical circuit diagram partly in block and schematic form of the control circuit of the present invention.

The analyzer coupled to furnace 10 of the present invention can be of the same basic construction as that disclosed in U.S. patent application Ser. No. 95,508 entitled Method and Apparatus for Gas Dosing for Linearization filed on Nov. 16, 1979, and assigned to the present assignee, the disclosure of which is incorporated herein by reference. The analyzer includes an infrared cell for the measurement of carbon monoxide content in the specimen gas which provides a direct indication of the amount of oxygen which is converted to carbon monoxide by the furnace during each fusion cycle. The temperature of the furnace is controlled in a stepwise fashion between ambient and about 3000° centigrade for fusion samples in the neighborhood of 0.1 to 2 grams by the control circuit 40 shown in FIG. 2 which is now described.

The controlled power supply 40 includes a power transformer 42 having a primary winding 41 coupled to a source of alternating voltage current such as a 240 VAC supply line by means of a controlled solid state switch 50 with a gate terminal 52 and controlled terminals 51 and 53 which are short circuited when the solid state switch is rendered conductive by control signals from a microprocessor 60, and which are opened when nonconductive. Switch 50 is a model 240D45 commercially available from Opto 22 Corp. The transformer 42 includes a secondary winding 43 for providing approximately 5.6 VAC to the electrodes 12 and 14 of furnace 10 by interconnecting terminals 45 and 46. The amount of power to the furnace is supplied by a unique modulation method which provides a greater or fewer number of cycles in a predetermined sequence of full wave alternating current cycles to the graphite crucible with the maximum current available with a continuous alternating current being approximately 1100 amperes.

A reference phase detecting transformer 48 has a primary winding 47 coupled across the power input terminals to receive information pertaining to the phase of AC voltage applied to the input of transformer 42. The transformer 48 includes a secondary 49 having one terminal coupled to the system ground and the remaining terminal coupled to a comparator circuit 51' which provides a signal to the microprocessor 60 representative of the positive going threshold voltage of each cycle of AC voltage applied to transformer 42. This signal is employed to provide switching of the solid state switch 50 at approximately at the zero crossover point of current for each cycle of operation thereby eliminating voltage transients which would otherwise cause glitches interferring with the data processing circuitry of the present invention. The current and thus operating power actually applied to the crucible assembly 15 at terminals 45 and 46 is monitored by a current monitor 60' including a detection loop 62 and which provides a signal to the input of preamplifier 64 having its output coupled to a precision rectifier circuit 66. The output from current monitor 60' is also applied to a drive circuit 68 having its output coupled to bar graph current indicator 69 indicating to the operator the instantaneous current being applied to the crucible during a combustion cycle.

The output of precision rectifier 66 is coupled to an integrator 67 and then to a system multiplexer 70 having one input coupled to the output of the integrator and its remaining inputs coupled to a variety of other system points to be monitored but which are not relevant to the present invention. The output of the system multiplexer 70 is coupled to a A to D converter 72 providing a 12-bit output code representative of the actual current applied to the crucible to a main microprocessor 74, conductors 73. Microprocessor 74 is an INTEL 8085 system including standard peripheral interface circuits coupling for example a keyboard 76 to the microprocessor and an output printer 78 thereto for receiving command information and for printing output data. Eight control lines for providing a 12-bit control signal to microprocessor 60 is provided as indicated by interconnection 79 for controlling the gating of solid state switch 50 according to a predetermined sequence.

In order to provide the desired temperature increase in a relatively uniform manner such that different compounds containing oxygen are separately combusted at detectable and separated peaks corresponding to different temperature levels, the power applied to furnace 10 must be precisely controlled. It has been discovered that controlling the number of cycles of alternating voltage current applied to the furnace as well as the arrangement of cycles either applied or not applied in a pattern has provided the most effective means of providing a uniform stepwise temperature increase for the furnace. In selecting the control method, it was decided to increase the temperature in approximately 33 distinct steps. Naturally a fewer or greater number of steps can be selected however if the number of steps becomes significantly smaller, the resolution (i.e., the available temperature levels) becomes prohibitively small and as the number of steps significantly increases, the time for a power level becomes excessive. Thus, 33 steps or temperature levels were selected empirically as an optimum value for controlling the furnace temperature. Each step in the preferred embodiment has a time span of from 1 to 25 seconds with 10 seconds being the optimum value employed in the preferred embodiment. Each step is subdivided into a number of cycles of 32 binary information bits with each bit corresponding to and representing one cycle of AC power either applied or not applied to the furnace. Thus, for example, for a one second step, for 60 Hz applied AC signal, approximately two sequences or patterns of applied power are applied to the furnace during the one second period. In the 10 second step of the preferred embodiment, about 19 series of power pulses of a predetermined identical pattern are repeatedly applied to the furnace with a different pulse pattern for each of the 33 steps. With the secondary voltage of approximately 5.6 volts on the power transformer 42, the crucible resistance of approximately 0.005 ohms, the total current availability is approximately 1100 amps which provides a maximum temperature in excess of 3000° C. Each step therefore is approximately 1100 amperes divided by 33 or 34 amps per step. Each step on the other hand provides approximately 100° C. increase in temperature. The pattern of controlling each cycle of applied voltage is not affected by the frequency of the power supplying current however, the number of cycles of repetition of such a power applied pattern will vary with line frequency. Thus, for example, with 60 Hz line frequency, approximately 18.75 repeating patterns of 32 bits of applied power is present for each step of the 33 continuously increasing temperature steps of the system.

Figures 3, 4:
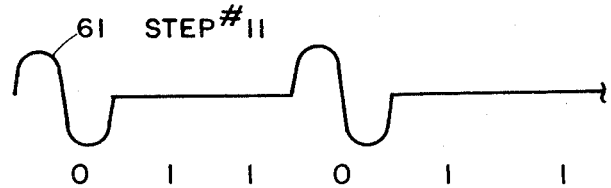
FIG. 3 is a table showing the array of binary bits employed to control the stepwise application of power to the furnace according to the present invention.
FIG. 4 is a waveform diagram illustrating a portion of the one power level of the system of the present invention.

The arrangement of the bit pattern for each series of bits for the 33 different patterns of control signals is shown in FIG. 3 in which the binary 0 represents a power on condition and a binary 1 represents a power off condition. Thus, for example, as seen in FIG. 4, which shows the current 61 actually applied to the furnace by the operation of solid state switch 50 for the first few bits of power level 11 (i.e. step 11) where the bit pattern begins 011011. It is seen that the solid state switch 50 is actuated only on the 0's such that current will be applied for a full cycle of operating line voltage upon the occurrence of a binary 0. Naturally, if the line frequency is 50 Hz instead of 60 Hz, a fewer number of each bit pattern will be repeated during a step of predetermined time duration. The bit pattern however will remain the same. The preferred embodiment of the bit pattern shown in FIG. 3 is valid for 50 and 60 Hz and it is believed to be valid for other relatively low frequency line voltages.

The bit pattern shown in FIG. 3 is controlled by the microprocessor 60 by storing the bit pattern of FIG. 3 in storage circuit means such as its memory and providing an identification code for each of the 33 bit patterns. The bits are serially read out repetitiously in response to the receipt of the identification code which is applied to microprocessor 60 through input control lines 79. The 32 bit sequences when serially applied to the solid state switch 50 are timed to provide a switching during the zero current cross-over point by virtue of the timing signal applied to microprocessor 60 from comparator 51.

Thus, by repeatedly applying each of the bit patterns 1 through 33, as shown in FIG. 3, a number of times depending upon the duration of each step, precisely controlled and predictable temperature steps are achieved in the fusion furnace. The result is that compounds of oxygen for example will be combusted and detected by the analyzer in a series, time separated pattern as shown by the graph 65 of FIG. 5.

Figure 5:
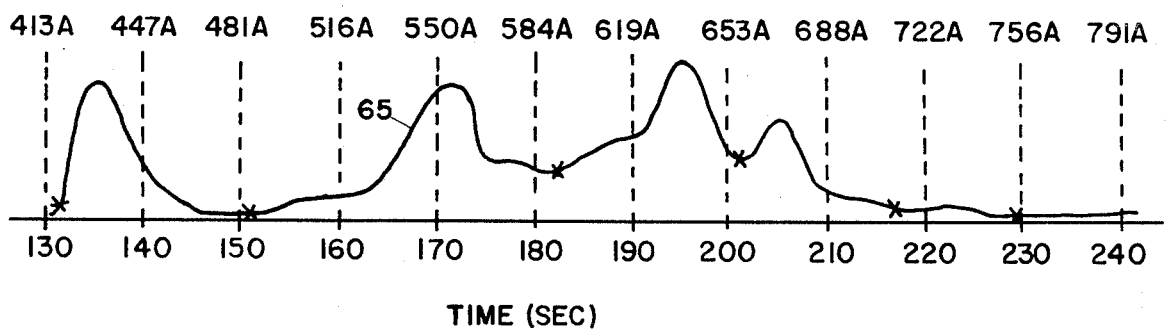
FIG. 5 is a graph illustrating the concentration of specimen gases as the power applied is stepwise increased to the furnace according to the present invention.

Referring now to FIG. 5 which shows a segment of a series of steps beginning approximately at step No. 13 and proceeding through step No. 24, the horizontal axis represents time while the vertical axis represents the concentration of oxygen detected. As can be seen, four relatively large and distinct peaks occur during steps 13 through 21 corresponding for example to FeO, $FE_2O_3$, $Al_2O_3$, and/or other compounds. These signals are applied to the A to D converter, then to the main microprocessor 74 which integrates the curve between the nodes identified by X's in FIG. 5 to provide the total oxygen content for each of the compounds as well as summing the component oxygen totals for determining the total oxygen in the sample. Thus, by precisely controlling the number of cycles of current applied to the furnace as well as a bit pattern in which individual cycles are applied, steps of precisely controlled temperatures is provided for separating components of oxygen or other desired specimen gases for analysis. The system, by time separating the peaks provides an indication of the nature of the compounds contained by the sample as well as quantitative information for each such compound.

The control system for the analyzer is substantially similar to that disclosed in the above identified patent application Ser. No. 95 508. A brief review however of the operation of the system pertaining to the furnace control is now presented in conjunction with FIG. 6 which is a flow chart of the programming of microprocessor 74 to achieve the desired analyzer and furnace operation. Initially, as indicated by block 90, a system update loop interrogates the system operator through a control console to select the system parameters such as the time period for each step as indicated by block 92, the starting current for the furnace is indicated by block 94, the nature of the desired printout is indicated by block 96, and whether or not a plot such as represented by FIG. 5 is to be printed out by printer 78 as indicated by block 98. Once these up-dates pertaining to the furnace operation and printout-type have been entered, the program proceeds to the analyze mode as indicated by block 100 for initiating a cycle of analysis. First in the analysis cycle is the outgasing routine 102 which applies full power to the furnace for a period of time sufficient to purge any contaminants from the crucible. Next, the analyze routine data acquisition and fusion control operation 104 is commenced with the fusion control pertaining to the control of the furnace operation as described above. During each of the temperature steps, the concentration of oxygen measured in the form of CO and $CO_2$ is determined and stored in temporary memory in microprocessor 74 for subsequent printing. Once the analysis routine is completed, the minimum concentration points or data nodes (identified in FIG. 5 as the points on curve 65 with the reference X) are determined as indicated by block 106 and the area between the nodes are integrated as indicated by block 108. If desired, since the relationship between applied current or power and the resultant temperature is known, as indicated by block 110, the correlation between current applied during each step and the temperature resultant from such current can be correlated to provide a data profile such as FIG. 5 in terms of time and temperature. Next, the oxygen content for each of the components is determined as indicated by block 112 by integrating the area under each of the curve segments shown in FIG. 5 and the values of the specimen gases printed out as indicated by block 114. If a plot is desired as indicated by the inquiry 116, the microprocessor actuates printer 78 to print the desired graph as indicated by block 118 after which the system returns to the system idle loop of block 90, where it recirculates until such time as a system update control is actuated.

Figure 6:
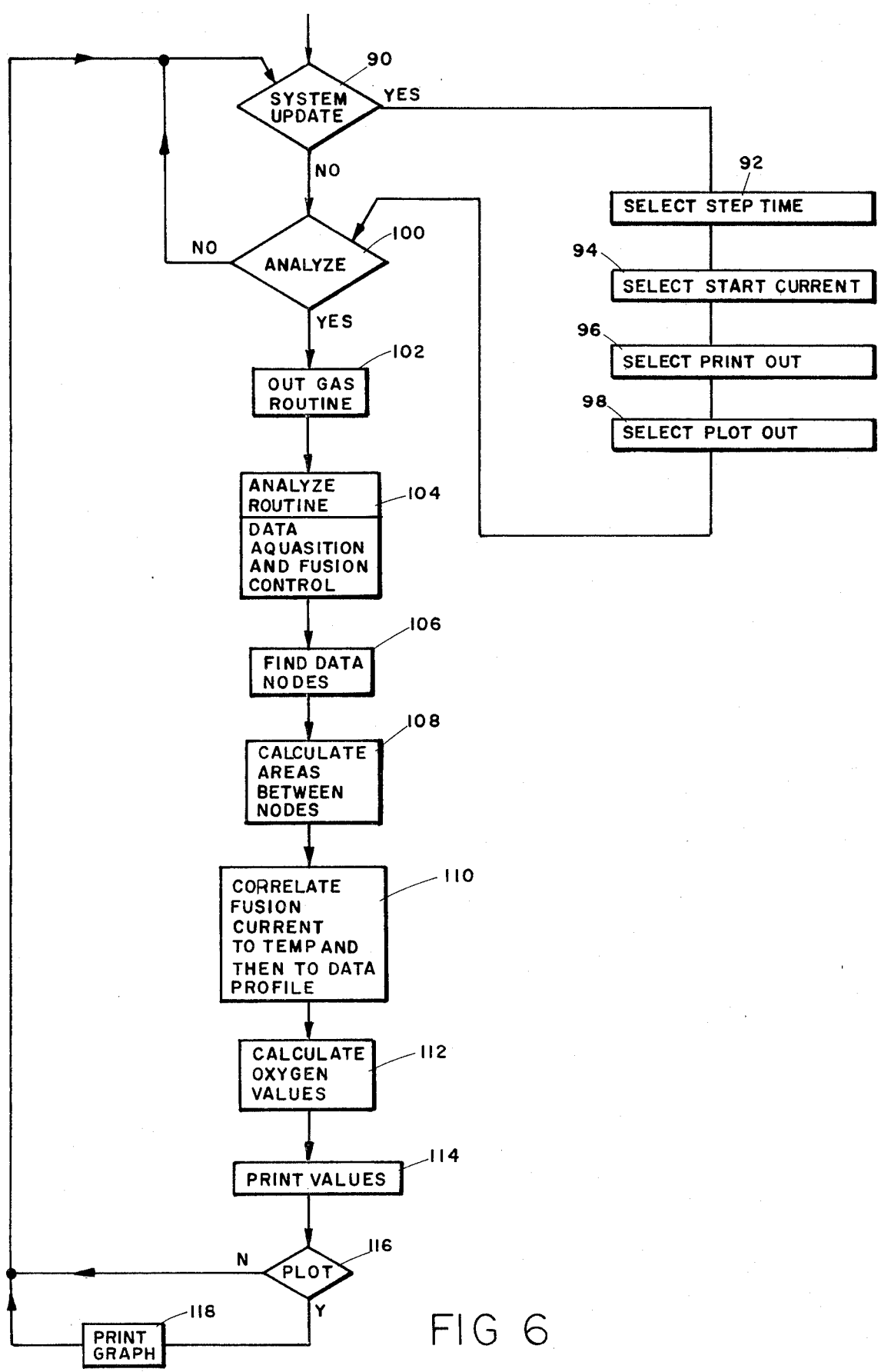
FIG. 6 is a flow diagram of the programming for the microprocessor employed in the control circuit of FIG. 2.

The specific programming to perform the basic calculating, correlating and integrating function, shown in FIG. 6 is conventional.

It will become apparent to those skilled in the art that various modifications to the preferred embodiment of the invention as described and disclosed herein can be made without departing from the spirit or scope of the invention as defined by the appended claims.

The embodiments of the invention in which an exclusive property or privilege is claimed are defined as follows:

1. A control system for applying operating power to an analytical furnace for containing an analytical specimen for fusion in which the temperature of the furnace is increased in a predictable and selectable fashion for fusion of an analytical specimen such that specimen gases from different compounds are spatially released, said control system comprising:

power supply means for supplying periodically varying current;

controllable switch means coupled to said power supply means;

a furnace heating element coupled to said switch means;

storage circuit means for storing an array of predetermined memory bit patterns, each indicative of a cycle series pattern of the supply current, each comprising an array of binary bits including a predetermined number of bits corresponding to a cycle of supply current; and control circuit means coupled with said storage circuit means for selectively actuating said switch means according to a predetermined sequence of said memory bit patterns, each successive memory bit pattern being indicative of at least as many cycles per series pattern as the preceding memory pattern, said control means including a microprocessor for providing control signals for application to said switch means according to said predetermined sequence of said memory bit patterns whereby operating current which increases in cycles per unit time in a predetermined manner is applied to said heating element to supply increasing power to said heating element such that the temperature of said furnace is increased in a controlled fashion for fusion of an analytical specimen such that specimen gases from different compounds are spatially released.

2. The system as defined in claim 1 wherein said switch means responds to said control signals for each binary bit of data to apply or not apply a cycle of supply power to said furnace heating element.

3. The system as defined in claim 2 wherein said furnace heating element includes conductive crucible means and electrodes coupled to said switch means and to said crucible means for applying power to said crucible means.

4. The system as defined in claim 3 wherein said power supply means includes a transformer with primary and secondary windings and means for coupling said primary winding to a source of alternating current voltage.

5. The system as defined in claim 4 wherein said switch means comprises a solid state switch coupled between said transformer secondary winding and said electrodes.

6. A method for controlling the temperature of an analytical furnace for containing an analytical specimen for fusion in which the temperature of the furnace is increased in a predictable and selectable fashion for fusion of an analytical specimen such that specimen gases from different compounds are spatially released, said method comprising the steps of:

providing a source of periodically varying electrical current;

selecting a plurality of predetermined sequences of cycles of the source current for application to the heating element, said selecting step includes providing an array of binary bit sequences each comprising a series of bits, the binary state of which determines the application or not of a cycle of source current to be applied to the heating element; and applying a predetermined series of said cycle sequences to the heating element in accordance with a predetermined series of said bit sequences, each successive cycle sequence containing at least as many cycles as the preceding cycle sequence, the number of binary bits determining the application of a cycle of source current in each successive bit sequence increasing progressively in a predetermined fashion to sequentially increase the power applied to the heating element thereby raising the temperature of the furnace in a predetermined fashion such that specimen gases from different compounds are spatially released.

7. A control system for application of operating power to an analytical furnace for containing an analytical specimen for fusion in which the temperature of the furnace is increased in a predictable and selectable fashion for fusion of an analytical specimen such that specimen gases from different compounds are spatially released, said control system comprising:

storage circuit means for storing an array of binary bit sequences each including a series of bits with each bit corresponding to a unit of operating power to be applied to an analytical furnace heating element;

means for providing continuous operating power; and control circuit means coupled to said providing means and to said storage circuit means and including output means for coupling said control circuit means to an analytical furnace heating element, said control circuit means applying increasing units of operating power per unit time to said output means in accordance with a predetermined ordering of said bit sequences, each successive bit sequence comprising at least as many bits, each indicating application of a unit of power to the heating element, as the preceding sequence, whereby said control circuit means responds to said array of binary bits to provide units of operating power to said output means in a sequence corresponding to and controlled by said array of binary bits.

8. The system as defined in claim 7 wherein said control circuit means and said storage circuit means include a microprocessor.

9. The system as defined in claim 8 wherein said means for providing continuous operating power comprises a source of alternating current voltage.

10. The system as defined in claim 9 wherein said control circuit means further includes controlled switch means coupled to said microprocessor to receive control signals therefrom and having switching terminals coupled between said providing means and said output means.

11. The system as defined in claim 10 wherein said control circuit means further includes means coupled between said source and said microprocessor for controlling the switching of said switch means such that current from said source is applied to said output means at the zero cross-over point.

* * * * *